United States Patent [19]
Ellison

[11] Patent Number: 4,841,893
[45] Date of Patent: Jun. 27, 1989

[54] BOAT FENDER

[75] Inventor: Richard P. Ellison, Alexandria, Va.

[73] Assignee: Boat America Corporation, Alexandria, Va.

[21] Appl. No.: 169,900

[22] Filed: Mar. 18, 1988

[51] Int. Cl.$^4$ .............................................. B63B 59/02
[52] U.S. Cl. .................................... 114/219; 114/220; 405/212
[58] Field of Search ............... 114/219, 267, 343, 220; 405/212, 215, 216

[56] References Cited

U.S. PATENT DOCUMENTS

| | | | |
|---|---|---|---|
| 2,413,210 | 12/1946 | Blackman | 114/219 |
| 2,903,990 | 9/1959 | Brown | 114/219 |
| 3,026,548 | 3/1962 | Dollinger | 114/219 |
| 3,113,546 | 12/1963 | Mountcastle | 114/219 |
| 3,498,252 | 3/1970 | Peacock | 114/219 |

FOREIGN PATENT DOCUMENTS 119065  3/1970  Norway .............................. 114/219

Primary Examiner—Joseph F. Peters, Jr.
Assistant Examiner—Stephen P. Avila
Attorney, Agent, or Firm—Robert K. Tendler

[57] ABSTRACT

A boat fender is provided with circumferential rings to prevent the fender from popping up from between the side of a boat and a corresponding dock or other structure to which the boat is tied off, with the circumferential exteriorally projecting rings providing for a rolling and tracking motion of the fender over the side of the boat to limit fender swing which maintains the fender in place and in a generally vertical orientation. This tracking prevents the non-tethered end of the fender from popping up and therefore provides security not available from other fenders, whether plain or having longitudinal ribs.

8 Claims, 4 Drawing Sheets

BOAT FENDER

FIELD OF INVENTION

This invention relates to boat fenders and more particularly to a boat fender which does not pop up during normal operation, even under relatively rough conditions.

BACKGROUND OF THE INVENTION

There have been many boat fenders in the past, both inflatable and resilient, which have been cylindrical and which have eyelets at the top or bottom thereof in order to be suspended from the superstructure of a boat such as a life line, hand rail or any convenient tying-off place. These fenders are usually suspended between a boat and the dock to which the boat is to be tied off and are usually set such that the contact between the dock and the fender is about mid-way up the fender. Note that these fenders are also used between boats which are "rafted" together.

The greatest problem with respect to these types of fenders is that they are not tied off top and bottom, but rather are tied off only at the top. Therefore they tend to pop out or pop up during either rough water conditions, the rise and fall of the tide, or indeed the mere boarding of a boat by persons utilizing the boat.

These fenders in general, are either inflatable or resilient and when pressure is applied by the dock the fender compresses unevenly and deforms so as to squish up and pop out from between the boat and the dock. This of course results in damage in terms of chaffing, rubbing, or even more severe damage, with there being no practical way of keeping the fenders in place when they are lowered over the side of the boat.

SUMMARY OF INVENTION

In contradistinction to these prior art fenders which may be cylindrical, and either vertically ribbed or not, the Subject fender has circumferential exteriorally projecting rings on the fender structure, which in the usual case includes a cylindrical body although this is not necessarily the only structure for which the rings will work. Preferably pairs of rings are used at each end of the fender body for better rolling action and limitation of fender swing. It is the purpose of these rings to provide a rolling and tracking action with the relative movement of a boat vis a vis that structure to which it is tied off, with the rolling and tracking action generally limiting fender swing. The limitation of the swing of the fender results in the fender being maintained in position and in a vertical orientation regardless of relative movement between the boat and the dock.

While there are many explanations which can be tendered for the effectiveness of the fenders made in such a manner, after extensive trials, it has been found that failure of the fender is extremely rare in terms of its coming up from between the boat from which it is slung and the structure to which the boat is tied off, whether that structure be a dock running horizontally at the water line, or another boat tied off side-by-side. The severity of the conditions under which the Subject fender has been tested extend from calm waters to wave swells on the order of 4 feet for vessels between 25 and 50 feet moored to floating docks.

What will be apparent from the above is that rather rough sea conditions have resulted in the observation that the subject fenders rather than popping up from between the boat and the structure to which it is tied off, exhibit a rolling and tracking action which limits fender swing and maintains the position and verticality of the fender. This is due to the double point contact of pairs of circumferential rings. The double point contact of pairs of rings provides for a rolling and tracking action of the fender against the side of the boat substantially parallel to the water when there is relative motion between the boat and the structure to which the boat is tied off. This means that the rings produce double tracks on the hull, which tracks are substantially perpendicular to the direction of the tethering line when the fender is hanging from the boat. This means that the tracks are substantially parallel to the surface of the water. Since the fender is tethered at one end, the fender is kept in place because the fender stops in its roll when its line becomes taut. Thus the fender swing is limited and the fender is prevented from popping up.

In addition to the prevention of physical damage, there is the question of personal safety which is improved through the utilization of the Subject fender. It is possible when one is coming aboard or leaving a vessel that one can slip in between the vessel and the dock. Should a fender flip up out of place, it is possible to crush the individual between the side of the boat and the dock. This is not an unusual occurrence and in addition to saving property, the Subject fender is capable of preventing the capturing of an individual between the side of a boat and a dock or other boat.

It is therefore an object of the Subject Invention to provide an improved fender which does not dislodge itself during rough conditions.

Another object of this Invention is to provide a fender in which rolling motion coupled with pairs of circumferential rings maintain the fender in position.

It is a still further object of this Invention to provide a fender with a rolling and tracking action over a surface of the hull of a boat which prevents the fender from popping up when the fender is tethered to boat from one end.

BRIEF DESCRIPTION OF THE DRAWINGS

These and other objects of the Subject Invention will be better understood in connection with the Detailed Description taken in conjunction with Drawings of which.

DETAILED DESCRIPTION

Figure 1:
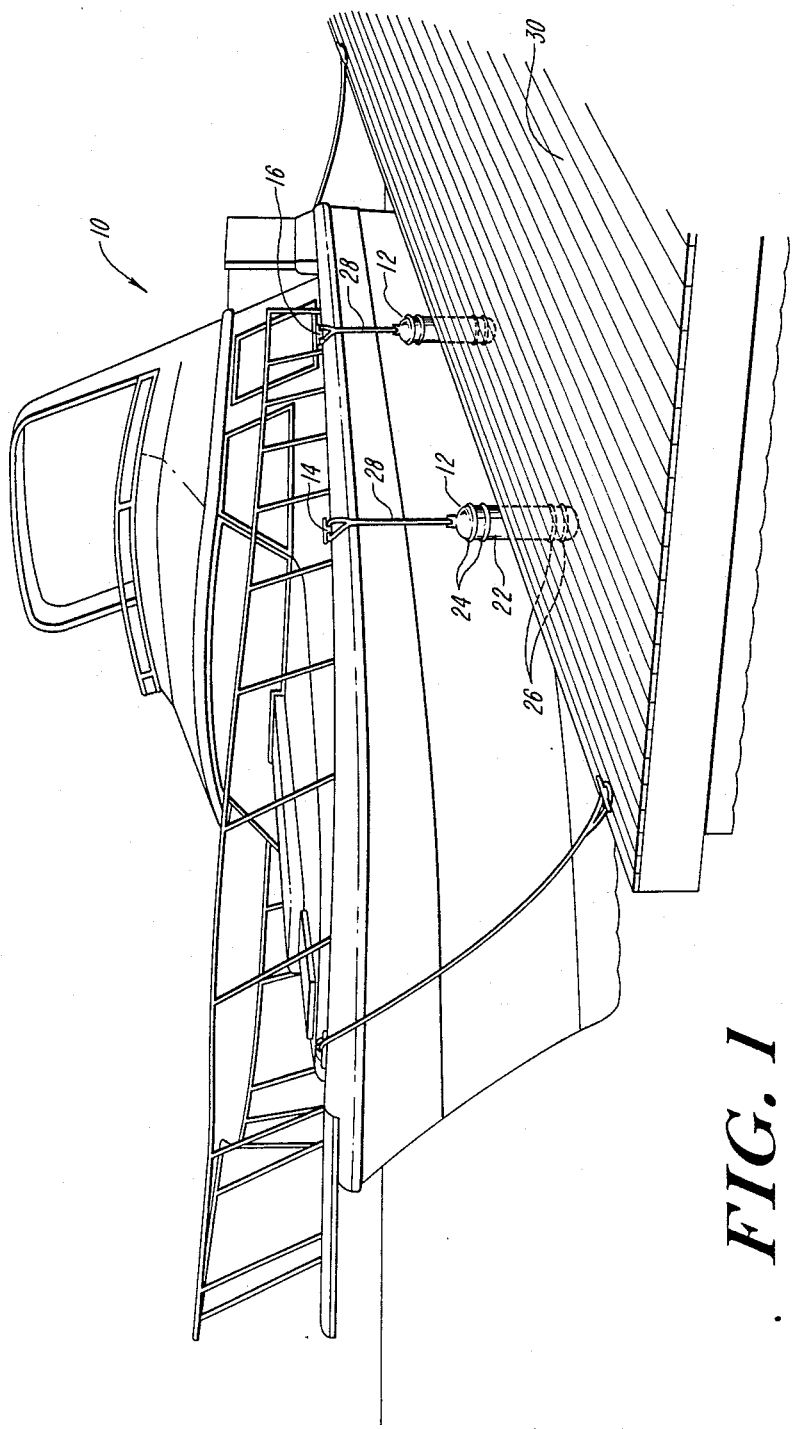
FIG. 1 is a diagrammatic illustration of the Subject fender in use.

Referring now to FIG. 1, a boat or vessel 10 is illustrated as having the Subject fenders 12 secured to cleats 14 and 16 respectively at the toe rail 20 of boat 10. Each of the fenders has a generally cylindrical body 22 and an upper pair of rings 24 which project outwardly and surround the fender; and with a pair of lower rings 26 similarly outwardly-projecting as illustrated in by the dotted lines. While a cylindrical fender is shown, since circular rings are used, the fender body can take on a variety of shapes. Preferably the fender is inflatable, with the circumferential sticking out an inch or so from the cylindrical body. In one embodiment the structure is unitary and is made of vinyl which aids in the tracking. Diameters range from 5" to 12" and lengths from 15" to 32".

These fenders are all suspended from the respective cleats via lines 28 such that ideally the fender is centered on a dock generally indicated by reference character 30. Thus the dock hits the fender midway between the rings. This is a typical way of mooring a boat to a dock or like structure, with spring lines not shown.

Figure 2A:
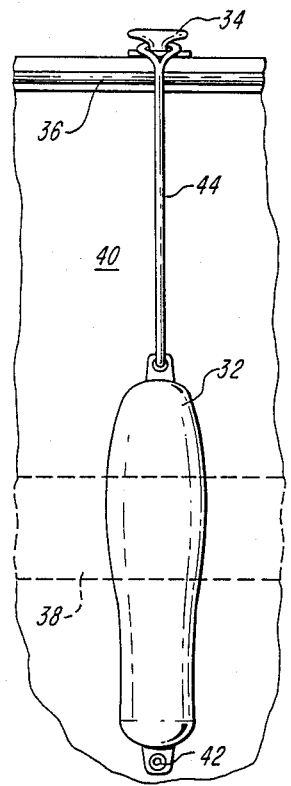
FIGS. 2 A, B and C are respectively diagrammatic illustrations of a prior art fender placed between the side of a hull and a corresponding dock, in which the fender is squeezed between the hull of the boat and the dock such that it is deformed into a bulbous structure which pops up and swings out as illustrated in FIG. 2B to become completely dislodged as indicated in FIG. 2C.
Figure 2B:
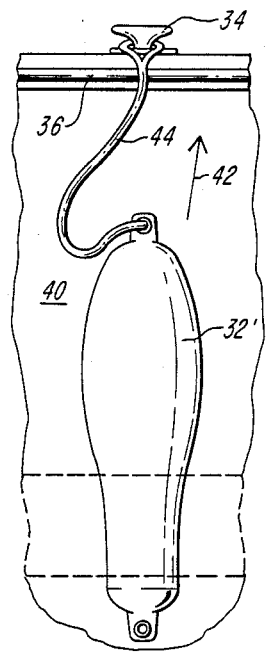
Figure 2C:
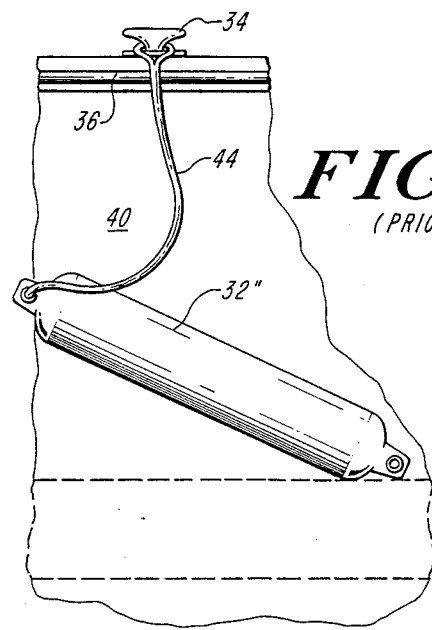

Referring now to FIGS. 2A 2B and 2C, here the fenders are of the prior art non-ribbed or longitudinally-ribbed variety. Assuming that each of the fenders here illustrated at 32, 32' and 32" are suspended from a cleat 34 at the toe rail 36 of a boat or vessel, and assuming that the fender is suspended between the boat and a dock generally indicated by dotted line 38, then upon movement of the side 40 of a boat towards the dock, the fender becomes compressed and is ejected upwardly as illustrated by arrow 42 in FIG. 2B due to the inability of any mechanism to maintain the fender in place.

The result of relative motion of the boat vis a vis the dock or any other structure to which the boat is tied off is that the compression of the fender, which is generally pneumatic, results in the ejection of the fender due to its deformation, such that the fender is literally spit out from between the boat and the dock in much the same way as an orange pit is ejected when squeezed between ones fingers. The reason for this ejectment of the prior fender is due to the lack of any securing means to keep the fender in place along the hull. It will be noted that in general only a single line 44 is utilized in the tying off of the fender to the corresponding boat.

Figure 3:
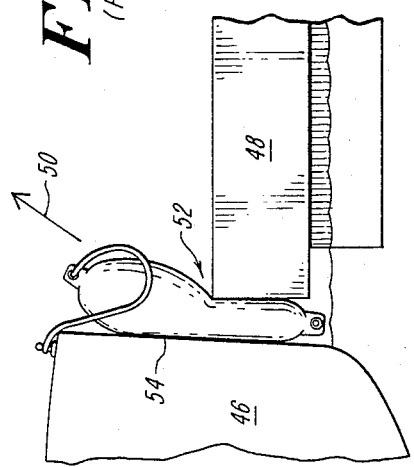
FIG. 3 is a diagrammatic illustration of the deformation of the fender of FIG. 2 illustrating how, without the Subject rings, the corresponding fender is pushed in at its base while presenting a bulbous portion at the top, such that the fender is ejected from between the boat and the dock in a squeezing action.

Referring to FIG. 3, fender ejectment from between a boat 46 and a dock 48 is diagramatically illustrated at arrow 50 in which the fender is deformed as illustrated in 52 to show that under a great many circumstances especially with rough wave action and the fender also being wet, the fender is ejected should there be no provision to prevent vertical movement or lateral swing of the fender vis a vis the side 54 of a boat.

Figure 4B:
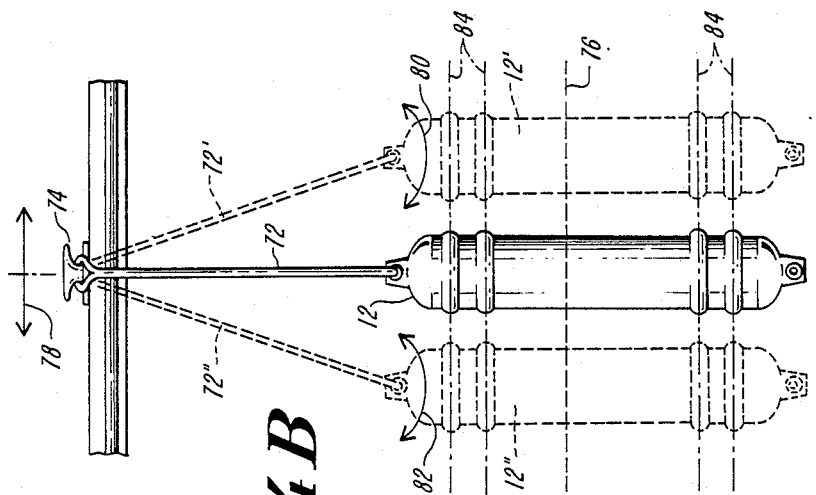
FIG. 4B is a diagrammatic illustration of the rolling motion of the Subject ringed fender, upon relative movement of the side of the boat with respect to a dock, illustrating a substantially parallel tracking, rolling action and limited motion of the fender, thereby preventing the popping up of the fender from between a boat and a corresponding structure.
Figure 4A:
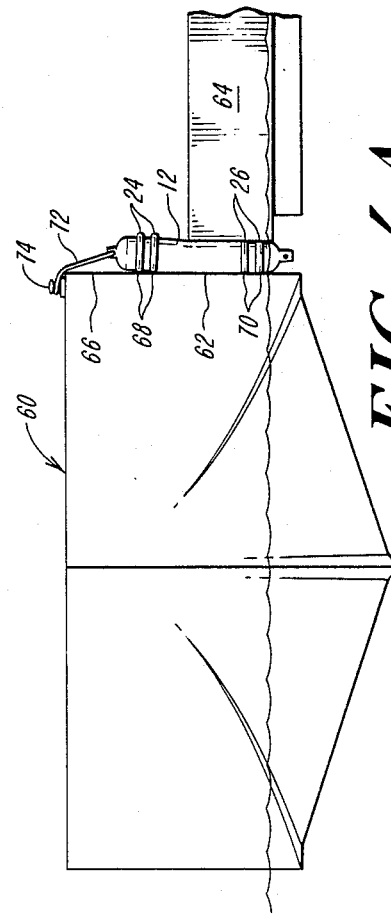
FIG. 4A is a diagrammatic illustration of the utilization of the Subject ringed fender for hulls having essentially straight sides, indicating the positioning of the fender between a boat and a respective dock.

In contradistinction to the prior art, and referring now to FIG. 4A a boat 60 having relatively vertical sides 62 is provided with the Subject fender 12 positioned between boat 60 and a dock 64. Here it will be appreciated that rings 24 which may be two or more in number contact the side 66 of the boat as illustrated at contact points 68, whereas the bottom rings 26 contact the side of the boat at contact points 70.

In operation, and referring to FIG. 4B, assuming that the Subject fender is tethered by a line 72 to a cleat 74, then relative motion of the boat vis a vis a dock 76 illustrated by double ended arrow 78 causes a rolling motion of fender 12 as illustrated by arrows 80 and 82 so that a limited swing is provided for fender 12 in that it can only move sideways as far as position 12' or position 12". The rolling motion in essence is forced along tracks illustrated by dashed lines 84 which are in general either horizontal or slightly upwardly arcuate. The fender moves only to a limited extent due to the parallel tracking caused by pairs of rings, and due to the length of line 72 which ties off the fender to the cleat.

The result of the tracking of the fender in a rolling action along the side of the boat maintains the fender in place in a generally vertical direction since the fender is allowed only a limited swing.

Any deformation of the fender does not result in the fender popping out from between the hull of the boat and the corresponding dock due to the tethering of the fender; and due to its rolling and tracking motion along the hull of the boat.

It will be appreciated that the swing of the fender along a flat sided boat is relatively circumscribed and in general is limited due to the action of the rings and the length of the line securing the fender, as well as the elasticity of the line.

Thus with respect to hulls which are generally flat-sided and vertically oriented, because a pair of rings is clamped to the hull the track of the rings along the hull is maintained substantially parallel to the water. Here the frictional forces clamp the rings to the hull for maintaining the fender vertical and limiting its swing at the appropriate position, regardless of even severe wave conditions.

It will be appreciated that the number of rings utilized to produce the above rolling action can increase beyond one set to the illustrated two sets, or more. Moreover, it is not necessary that the body of the fender 12 be cylindrical, but in fact the body could be multi-sided or of any desirable shape, with pairs of rings providing for the rolling action nonetheless. Thus the Subject Invention is not limited to cylindrical fenders, although this is a popular method of making same.

Figure 5A:
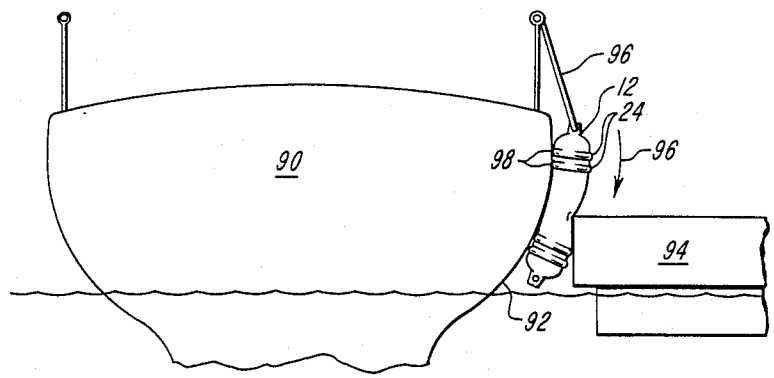
FIG. 5A is a diagrammatic illustration of the Subject fender for utilization on boats having a soft chine, in which the fender is illustrated as being positioned between the side of the boat and a corresponding dock, also illustrating a generally downward force generated when wave motion presses the boat closer to the dock; and, FIG. 5B is a diagrammatic illustration of the movement of the fender FIG. 5A when utilized to fend off a soft chined boat, showing generally downwardly curved tracks of the rings of the fender against the side of the boat due to a pivoting moment about the upper rings, and due to the curvature of the side of the boat.
Figure 5B:
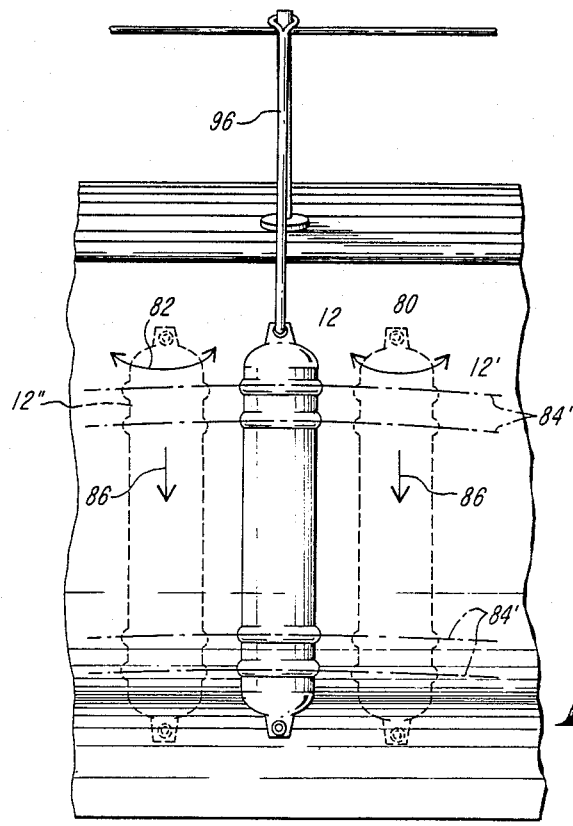

Referring to FIG. 5A a vessel 90 having a soft chine 92 is provided with the Subject fender 12 interposed between a dock 94 and the soft or curved side or chine of a vessel or boat 90. The fender is secured to a lifeline via a line 96 such that upon the boat moving towards dock 94, the fender is canted downwardly as illustrated by arrow 96 and actually pivots at points 98 where rings 24 contact the side of the hull. Thus an additional advantage to the utilization of the Subject fender with soft chined boats is that there is increased pressure on the upper pair of rings to maintain the tracking of the rings when there is relative motion between the boat and the dock. Referring to FIG. 5B, the situation illustrated in FIG. 5A is depicted showing the shift of fender 12 between positions 12' and 12", with the tracks 84 being curved slightly downwardly due to the downward forces illustrated by arrows 86 as the fender moves limitedly to the left and to the right of its original position with the relative movement of the boat vis a vis the dock. The reason for the downward direction of the tracks is the aforementioned downward force produced by the soft chine of the boat.

In both cases it will be appreciated that the amount that the fender is allowed to swing to either side of its initial rest position is limited primarily by the pairs of rings and the length of the line tethering the fender to the boat, as well as the elasticity of this line. In any event it has been found that the rotation of the fender illustrated by arrows 80 and 82 causes the fenders to track along the side of the boat and stop rather than being flipped out or ejected. This limited movement is due to the tethering and the tracking action of the rings on the hull of the boat which allows only slight horizontal movement of the fender. It is this action which preserves the fender's position so that it can be maximally effective.

Having above indicated a preferred embodiment of the present invention, it will occur to those skilled in the art that modifications and alternatives can be practiced within the spirit of the invention. It is accordingly intended to define the scope of the invention only as indicated in the following claims.

I claim:

1. A fender having an elongated body portion with an elongated central region, and means for tethering one end thereof to a structure, said body portion including at least one circumferential exteriorally projecting ring at the tethered end thereof and at least one circumferential exteriorally projecting ring at the non-tethered end thereof, said elongated body being devoid of rings in the central region of said fender, thereby providing a spaced multi-point contact at said tethered and non-tethered ends with said structure when adjacent thereto, said exteriorally projecting rings projecting outwardly by an amount sufficient to provide a rolling and tracking motion of said fender over said structure substantially perpendicular to the direction of said tethering line when said fender is hung from said structure.

2. The fender of claim 1 wherein said fender includes spaced pairs of said rings and wherein said spaced pairs of rings are at the tethered and non-tethered ends of said fender.

3. The fender of claims 1 wherein said rings are integral to said fender body.

4. The fender of claim 1 wherein said fender body is cylindrical.

5. The fender of claim 1 wherein said fender is inflatable.

6. The fender of claim 1 wherein said fender body is resilient.

7. The fender of claim 1 wherein said fender is made of a vinyl material.

8. The fender of claim 1 wherein the structure to which said fender is tethered is a water-borne vessel.

* * * * *